C. A. PRATT.
CAR.
APPLICATION FILED JAN. 28, 1907.

908,134.

Patented Dec. 29, 1908.

2 SHEETS—SHEET 1.

Witnesses,
Edward T. Wray.
Edna K. Reynolds.

Inventor.
Charles A. Pratt.
by Parker & Carter
Attorneys.

C. A. PRATT.
CAR.
APPLICATION FILED JAN. 28, 1907.

908,134.

Patented Dec. 29, 1908.

2 SHEETS—SHEET 2.

Witnesses.
Edward T. Wray.
Edna K. Reynolds.

Inventor.
Charles A. Pratt
by Parker & Carter
Attorneys.

UNITED STATES PATENT OFFICE.

CHARLES A. PRATT, OF CHICAGO, ILLINOIS, ASSIGNOR TO GOODMAN MANUFACTURING COMPANY, OF CHICAGO, ILLINOIS, A CORPORATION OF ILLINOIS.

CAR.

No. 908,134.  Specification of Letters Patent.  Patented Dec. 29, 1908.

Application filed January 28, 1907. Serial No. 354,427.

*To all whom it may concern:*

Be it known that I, CHARLES A. PRATT, a citizen of the United States, residing at Chicago, in the county of Cook and State of Illinois, have invented a certain new and useful Improvement in Cars, of which the following is a specification.

This invention relates to cars, and has for its object to provide means for applying brakes to the ordinary industrial cars, such as mine cars and cars used for carrying coal, cement, stone, brick and the like.

This invention is illustrated in the accompanying drawings, wherein—

Figure 1:
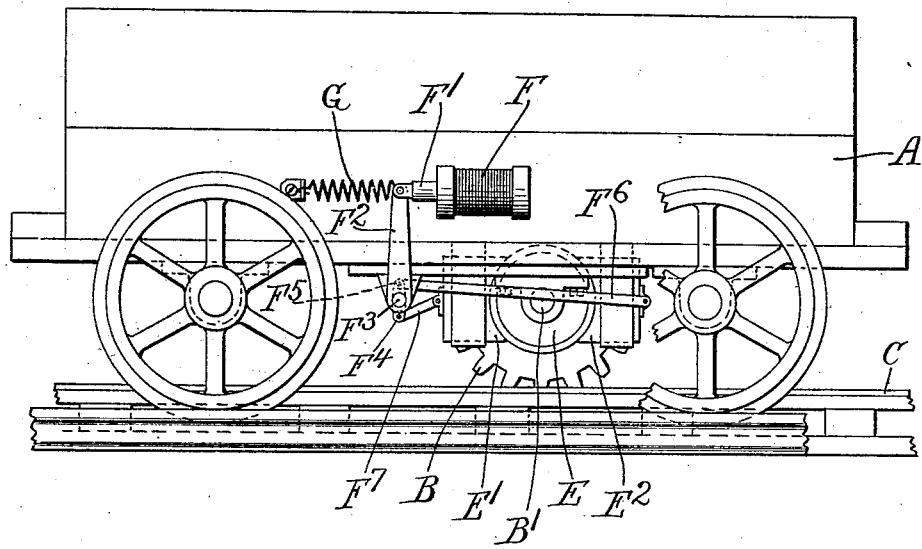
Figure 2:
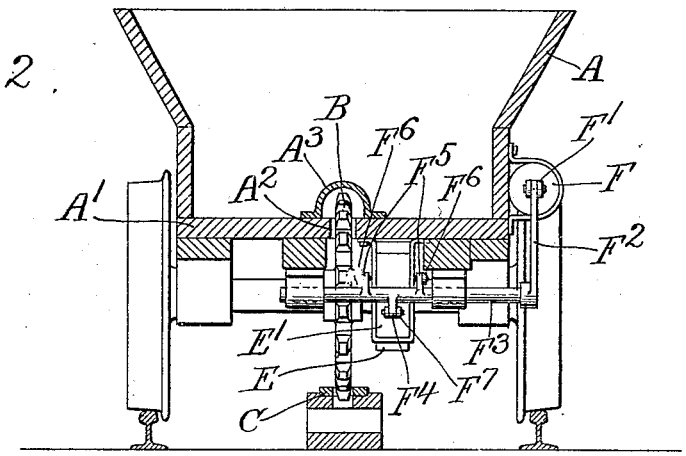
Figure 3:
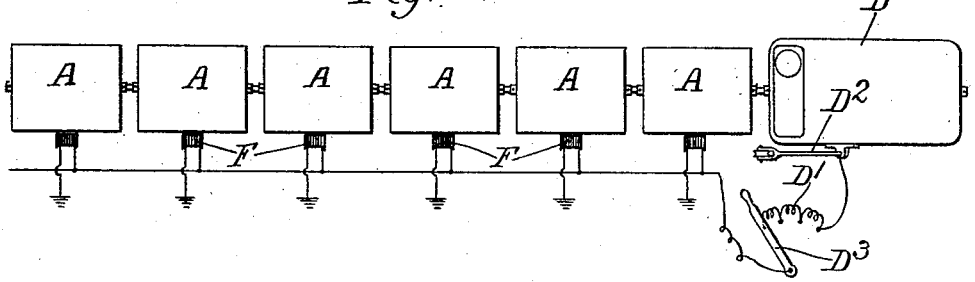
Figure 4:
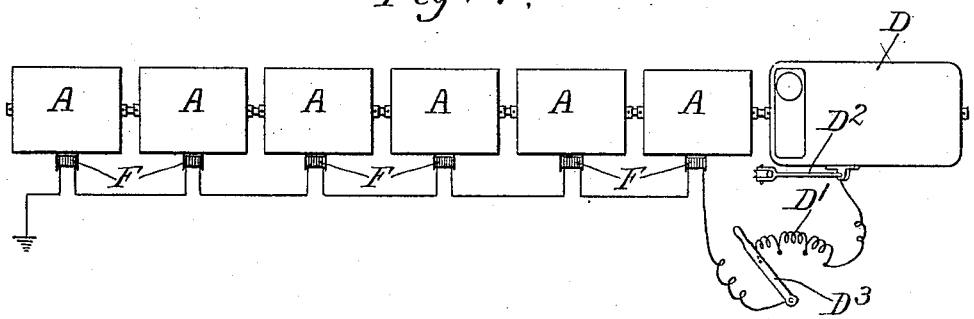
Figure 5:
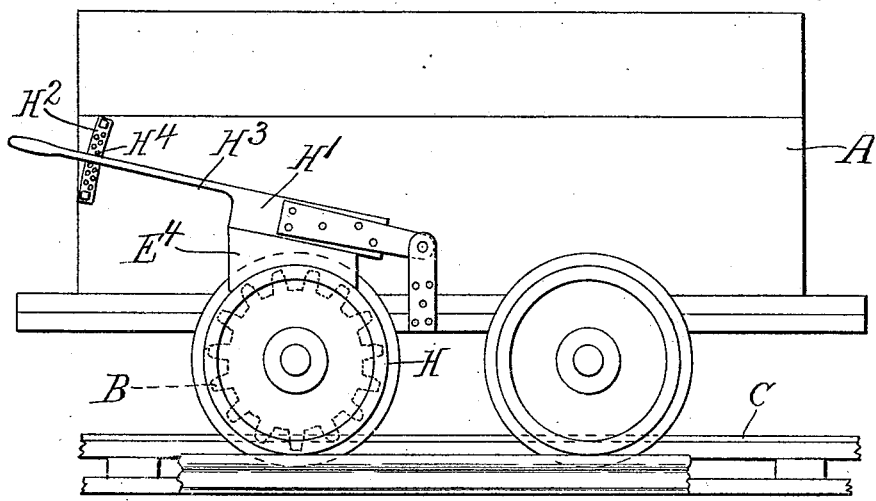

Figure 1 is a view showing a mine car embodying my invention; Fig. 2 is a sectional view of the car shown in Fig. 1; Figs. 3 and 4 are diagrammatic views showing the arrangement of the circuits; Fig. 5 is a view showing a modified construction.

Like letters refer to like parts throughout the several figures.

As illustrated in Figs. 1 and 2 I have shown an ordinary mine car with one form of braking device applied thereto. In carrying out the invention there is added to this ordinary car A a sprocket wheel B supported on a shaft or axle $B^1$. This sprocket wheel engages a rack rail C suitably fastened in position. The locomotive D also has a sprocket wheel which engages the rack, the forward movement being accomplished thereby, the locomotive having a motor thereon which rotates its sprocket wheel. The bottom $A^1$ of the car is cut away at $A^2$ so as to provide space for the sprocket wheel, and there is a protecting shield $A^3$ attached to the bottom to prevent the material from escaping from the car and from coming into contact with the sprocket wheel. Associated with the sprocket wheel is a brake wheel or element E which is connected with the sprocket wheel so as to rotate therewith.

Associated with the brake element E are the brake shoes or elements $E^1$, $E^2$. Some means is provided for actuating these brake elements or shoes so as to force them against the brake wheel. As shown in Figs. 1 and 2 there is associated with the car a solenoid F provided with a core $F^1$ attached to an arm $F^2$ connected with a shaft or rod $F^3$ carrying the arms $F^4$, $F^5$. The arm $F^4$ is connected by the connecting piece $F^7$ with the brake shoe $E^1$, while the arm $F^5$ is connected by the connection $F^6$ with the brake shoe $E^2$. The core $F^1$ is provided with a retracting spring G. The brakes are set by the spring G which moves the arm $F^2$ and forces the brake shoe $E^1$, $E^2$ against the brake wheel. When it is desired to release the brakes, the solenoid F is energized. The core $F^1$ will be moved into the solenoid, and the arm $F^2$ and shaft $F^3$ rocked so as to cause the brake shoes to be moved away from the brake wheel E.

In Figs. 3 and 4 I have illustrated a series of cars connected with the locomotive D. In Fig. 3 the solenoids F are connected in multiple circuit, and in Fig. 4 they are connected in series. The circuit leading to the solenoids is controlled by a rheostat $D^1$ located on the locomotive, and provided with a series of resistances which are connected to the trolley in any desired manner. As herein shown the connection is made through trolley pole $D^2$. The rheostat arm $D^3$ is connected in circuit with the solenoids. When the circuit is complete at the rheostat and the current is on, the current will pass through the solenoids and hold the brake shoes away from the brake wheels. If it is desired to set the brakes, the rheostat arm $D^3$ is moved along toward the position shown in full lines. The current can thus be gradually decreased, and the brakes gradually applied to any degree desired. If at any time the current supply fails the brakes will be automatically set by the springs, thus preventing the train from getting beyond the control of the operator.

In Fig. 5 is illustrated a modified construction, wherein the brake is applied directly to the car wheel H in any suitable manner, as by means of the hand lever $H^1$ provided with a brake shoe $E^4$. The sprocket wheel is mounted on the same axle as the wheel, and hence the pressure on the wheel retards the sprocket wheel, and a braking effect is secured by the sprocket wheel, and can thus be secured in any desired degree, as it would be impossible for the wheel H to slip on the track as would be the case if the sprocket wheel and rack were not used.

The hand lever $H^1$ is preferably arranged so as to have an elastic connection with a holding piece $H^2$. As herein shown this is secured by making the lever small as shown at $H^3$ so as to have a spring action. The brake is set by moving the handle under the pin $H^4$ on the holding piece $H^2$, there being a series of holes for the pin so that the pin can be moved from one to the other as the brake wears, thus making it possible to secure a pressure upon the wheel by the spring action of the part $H^3$.

By having the bottom of the car arranged so that a portion of the sprocket wheel projects above the normal plane of the bottom of the car, that is, above the plane of the lowest portion of such bottom, the center of gravity of the car is lowered and the volume of the material which the car will hold in a given height will be greatly increased.

I claim:

1. The combination with a car adapted to be filled with material to be hauled of a shaft, a sprocket wheel fixed upon said shaft so as to rotate therewith at all times and adapted to engage a rack rail, a brake element connected with said sprocket wheel so as to rotate therewith, a second brake element associated with said first brake element, and means for bringing the two brake elements into contact to retard the rotation of the sprocket wheel.

2. The combination with a car adapted to be filled with material to be hauled of a sprocket wheel mounted upon said car below the bottom thereof and adapted to engage a rack rail, an opening in the bottom of said car into which said sprocket wheel projects, a shield for said opening, a brake element connected with said sprocket wheel so as to rotate therewith, a second brake element associated with said first brake element, and means for bringing the two brake elements into contact to retard the progress of the car.

3. The combination with a car adapted to be filled with material to be hauled, of a sprocket wheel mounted upon said car below the bottom thereof and adapted to engage a rack rail, a brake element connected with said sprocket wheel so as to rotate therewith, a second brake element associated with said first brake element, and an electrically actuated device mounted on said car and connected with one of said brake elements so as to control the same.

4. The combination with a car adapted to be filled with material to be hauled, of a sprocket wheel mounted upon said car below the bottom thereof and adapted to engage a rack rail, a brake element connected with said sprocket wheel so as to rotate therewith, a second brake element associated with said first brake element, a solenoid mounted on said car, a rod on the car provided with an arm connected with the core of said solenoid, a connection between said rod and one of said brake elements whereby, when the solenoid is energized, the brake element will be moved, and an opposing spring associated with said solenoid.

5. The combination with a car adapted to be filled with material to be hauled of a sprocket wheel mounted upon said car below the bottom thereof and adapted to engage a rack rail, a brake element connected with said sprocket wheel so as to rotate therewith, a second brake element associated with said first brake element, an electrically actuated device mounted on said car and connected with one of said brake elements so as to move it away from the opposed brake element, a spring for moving said brake elements into contact, and means located at a distance for controlling said electrically actuated device, the parts arranged so that when the current fails the brake will be set.

6. The combination with a series of cars, each provided with a sprocket wheel having a brake device associated therewith, of means located at a distant point for controlling said brake devices.

7. The combination with a series of cars, each provided with a sprocket wheel having a brake device associated therewith, an electrically actuated controlling device associated with the brake device, and means at a distant point for controlling said electrically actuated devices, the parts arranged so that when the current fails the brakes will be set.

8. The combination with a car adapted to be filled with material to be hauled of a sprocket wheel mounted upon said car below the bottom thereof and adapted to engage a rack rail, an opening in the bottom of said car into which said sprocket wheel projects, a brake element connected with said sprocket wheel so as to rotate therewith, a second brake element associated with said first brake element, and means for bringing the two brake elements into contact to retard the progress of the car.

9. The combination with a car adapted to be filled with material to be hauled of a sprocket wheel mounted upon said car and adapted to engage a rack rail said sprocket wheel mounted upon said car beneath the bottom thereof, a portion of said sprocket wheel projecting above the lowest portion of said bottom.

10. The combination with a car adapted to be filled with material to be hauled, of a sprocket wheel fixed upon said shaft, a traction wheel fixed to said shaft and forming a brake element, a second brake element opposed to said traction wheel, and means for bringing the brake element and the traction wheel into contact to retard the rotation of the sprocket wheel.

CHARLES A. PRATT.

Witnesses:
EDNA K. REYNOLDS,
DONALD M. CARTER.